United States Patent [19]
Gordon

[11] 3,936,059
[45] Feb. 3, 1976

[54] SEALING BOUNDARY GASKET FOR COMPRESSION BETWEEN FLANGED PORTIONS OF TWO MATING METAL MEMBERS

[75] Inventor: Alexander L. Gordon, Worcester, Mass.

[73] Assignee: Federal-Mogul Corporation, Southfield, Mich.

[22] Filed: Mar. 21, 1975

[21] Appl. No.: 560,571

Related U.S. Application Data
[63] Continuation of Ser. No. 402,994, Oct. 3, 1973.

[52] U.S. Cl. .......... 277/166; 277/235 B; 277/207 R; 277/215
[51] Int. Cl.² ............... B65D 53/06; F16J 15/02
[58] Field of Search........ 277/166, 207 R, 208, 211, 277/235 B; 123/90.37, 90.38

[56] References Cited
UNITED STATES PATENTS

| | | | |
|---|---|---|---|
| 1,969,795 | 8/1934 | Hewitt | 277/207 R |
| 3,625,527 | 12/1971 | Brindle | 123/90.38 |
| 3,653,673 | 4/1972 | Green | 277/211 |
| 3,874,675 | 4/1974 | Belter et al. | 277/211 |

OTHER PUBLICATIONS
Ford Marketing Corp.; 1974 Car Shop Manual, Vol. II; Sept. 1973; p.21-05-10.

*Primary Examiner*—Richard E. Aegerter
*Assistant Examiner*—L. Footland
*Attorney, Agent, or Firm*—Owen, Wickersham & Erickson

[57] ABSTRACT

A sealing boundary gasket for compression between flanged portions of two mating metal members each of which has two longitudinal flat side portions that lie in different planes from each other and end portions that join the side portions. A one-piece integrally molded elastomeric gasket is provided having two lengthwise strip portions that are generally planar and two end strip portions. Each bolt opening is encircled by a flexible gasket portion that extends inwardly from the longitudinal portions and is readily flexed to a different plane therefrom. Each opening is provided with a circular rib which, as seen in cross section, is wedge-shaped; for example, its thinnest portion may face the outside of the gasket and its thickest portion may face directly to the inside of the gasket. Preferably, one side of one surface of the gasket is flat and the other one is ribbed. In some form of the invention the end strip portions, as molded, are arcuate and match the arc of the arcuate end portions of the mating metal members between which they are to lie. The effect is to produce a much more exact sealing arrangement which is free from leakage of liquids.

5 Claims, 9 Drawing Figures

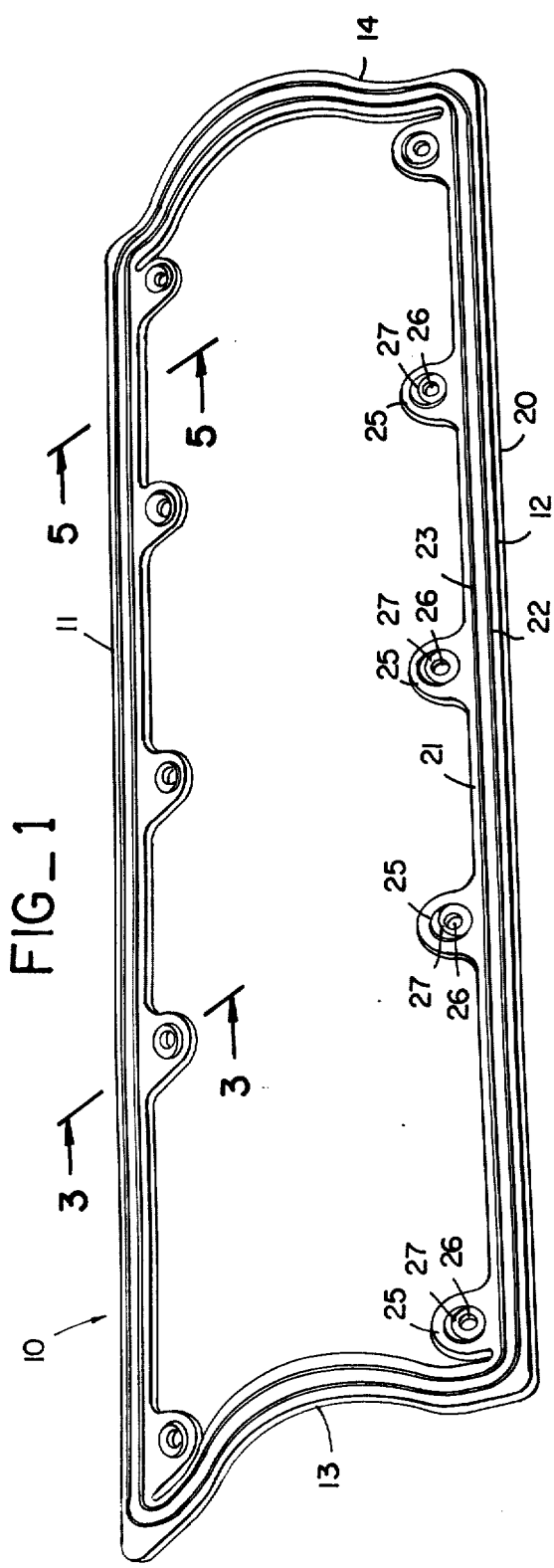
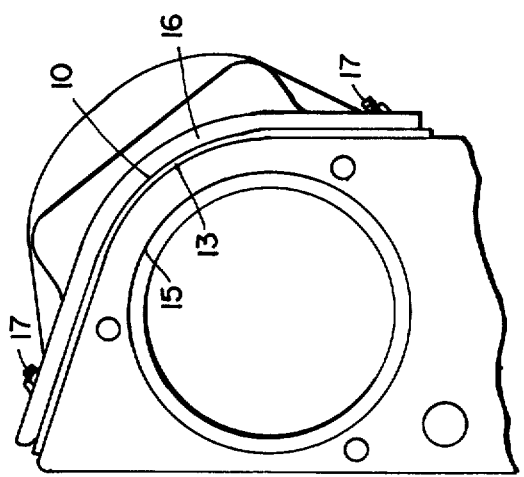
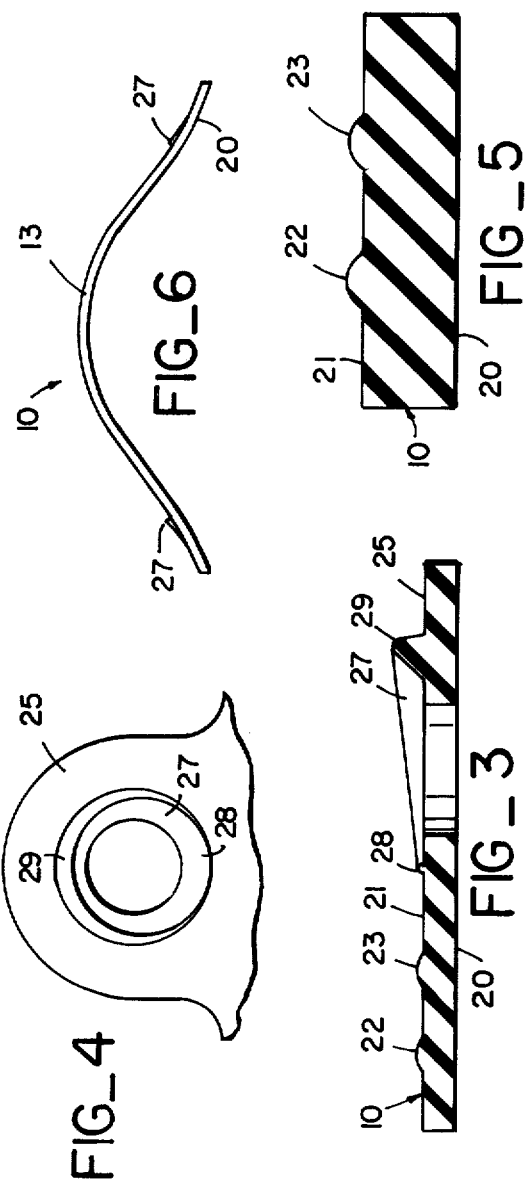

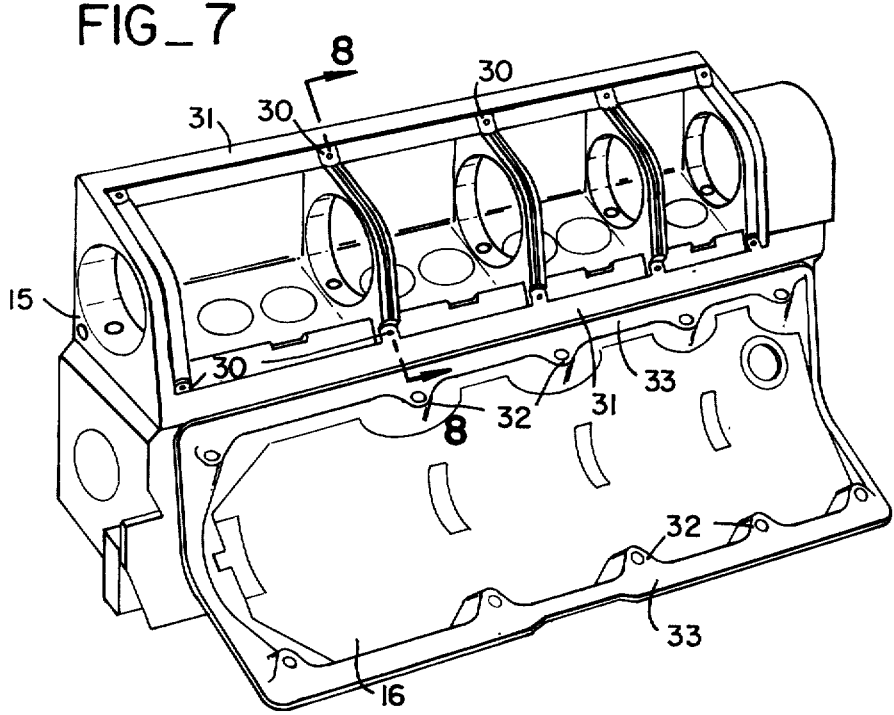

SEALING BOUNDARY GASKET FOR COMPRESSION BETWEEN FLANGED PORTIONS OF TWO MATING METAL MEMBERS

This is a continuation, of application Ser. No. 402,994, filed Oct. 3, 1973.

BACKGROUND OF THE INVENTION

This invention relates to a boundary-sealing gasket which seals all around the periphery of a space which is generally rectangular in shape but which has the peculiarity that its long edges lie along different planes that are inclined to each other.

Such a gasket is encountered in some automobile engines at the valve rocker cover or camshaft cover. These valve rocker covers are typically stamped members, made to such shapes as are determined by the cylinder head or camshaft housing. However, although some valve rocker covers are completely flat and planar, others make a turn of as much as 90°, which may be around arcuate end portions.

Heretofore, valve rocker cover gaskets have been made from cork composition or cork and rubber compositions that have been molded and skived into sheets and then cut out; the sheets are made completely flat or planar and of uniform thickness, typically about one-eighth inch thick. Such gaskets may be satisfactory for use in a joint with opposing flat faces, but have not proved satisfactory where the long edges lie in different planes, especially where the bolt openings lie in still different planes. Leakage has tended to develop around the bolts, with serious results, since the compression load has not held. Further complications have developed where there are arcuate end portions. In other words, the problem has been that, not being able to adapt exactly to configurations which lie out of a single plane, the gasket has tended to allow some leakage of liquids such as lubricating oils.

SUMMARY OF THE INVENTION

The present invention comprises a sealing boundary gasket which is made of a flexible, rubber-like elastomer molded in one integral piece to a shape corresponding in general to that of the parts between which it is to fit. Thus, when there are two longitudinal portions, those longitudinal portions are molded to each lie substantially planar, but they also have a series of tab-like bolt-encircling portions that can readily be flexed to a different plane from that of the longitudinal portions. The longitudinal portions are joined together by a pair of end portions which are molded to match the configuration of the parts between which they are to serve as a gasket; for example, the end portions may have an arcuate configuration extending around such a length of arc as the two metal members describe, whether that be an arc of 30°, 45°, 60° or 90°, or something in between. Thus, in the first place, the present invention accomplishes an improved sealing arrangement by providing a gasket that is initially in the approximate shape which it will have to assume eventually, so that it does not need to accommodate and make major changes in shape. Also, it can flex around each bolt opening and can further compress locally and adapt itself to minor imperfections without having to take care of major shape differences.

A very important feature is that the gasket rings, integral with the gasket, which surround each of the several bolt openings can not only readily flex to lie in different planes, but also are each provided with a circular rib, which as seen in cross section is wedge-shaped. For example, it may be thinnest at the point near the longitudinal portion of the gasket, the one facing outwardly from the opening, and thickest at the inner portion. The shape of the wedge is made to compensate for the direction in which the bolts are inserted and provides good sealing around the bolts so that the gasket will not permit leakage through the bolt openings.

A further feature of the invention is the provision of ribs on one surface, preferably the upper surface of the gasket to improve the sealing against a member such as a valve rocker cover which is usually a relatively thin stamped member and which may tend to have a somewhat more irregular surface than the machined cast cylinder head below it.

BRIEF DESCRIPTION OF THE DRAWINGS

In the drawings:

FIG. 1 is a view in perspective of an integral molded gasket embodying the principles of the invention.

FIG. 2 is a view in end elevation of an installation incorporating the gasket of FIG. 1.

FIG. 3 is a greatly enlarged view in section taken along the line 3—3 in FIG. 1, at a bolt opening.

FIG. 4 is a fragmentary top plan view looking down on FIG. 3.

FIG. 5 is a greatly enlarged view in section taken along the line 5—5.

FIG. 6 is a view in end elevation of the gasket of FIG. 1.

FIG. 7 is a view in perspective of an installation, like that in FIG. 2, without the gasket in place and in open position.

FIG. 8 is an enlarged view in section taken along the line 8—8 in FIG. 7.

FIG. 9 is a further enlarged view of a portion of FIG. 8.

DETAILED DESCRIPTION OF A PREFERRED EMBODIMENT

A preferred embodiment of the invention for one particular camshaft cover installation is shown in FIG. 1 as a gasket 10. The gasket 10 has two longitudinal portions 11 and 12 which are flat, each being substantially planar, and it has two end portions 13 and 14 which are arcuate and which join the portions 11 and 12 together to completely enclose the periphery. This gasket 10 is characterized by being molded to this shape, so that it has the shape shown before it is to be put into an installation. By molding the gasket 10 with arcuate portions 13 and 14 there is no tendency for the end portions to have to creep or compress on themselves when installed, thereby causing wrinkles which tend to lead toward leakage. Instead, the gasket 10 is substantially uniform in its thickness when installed as well as before it is installed, and the arcuate members 13 and 14 being made to the exact arc of the parts between which the gasket 10 is to fit, can be very accurate. This is a substantial advance in itself over prior-art valve rocker cover or camshaft cover gaskets.

FIG. 2 shows an installation, in which there is a camshaft housing 15 and a camshaft cover 16. The two metal parts 15 and 16 thus comprise one cast machined part 15, such as a cylinder head, and one stamped metal part 16 of lighter thickness such as a camshaft cover. The gasket 10 is placed between the metal parts 15 and 16, and a series of bolts 17 are then used to tighten the assembly together. As shown in FIGS. 1 and 5, the gasket 10 is preferably made with its lower surface 20 completely flat and with its upper surface 21 ribbed as provided by the two peripheral ribs 22 and 23 which go all the way around the gasket 10, including both longitudinal portions 11 and 12 and both arcuate portions 13 and 14. These relatively shallow projecting ribs 22,23 provide for exact sealing even where stamped member 16 may have some minor imperfections.

The gasket 10 is also provided with a series of ring gaskets 25 used to encircle each of the bolts 17 which is used to tighten the members 15, 10, and 16 together. In this instance, there are ten bolts 17, and the gasket 10 has ten openings 26 that are spaced according to the location of the bolts which may or may not be an even spacing. In the instance shown, in fact, the spacing is somewhat uneven because that is the structure which was best for the installation as a whole. Each of the ring gaskets 25 surrounding a bolt 17 is in itself a complete gasket around the bolt, but it is also integral with a longitudinal portion 11 or 12 of the gasket 10, so that a very good sealing arrangement is provided in one integral gasket. Yet it is flexible, so that it can flex to a different plane from the adjacent longitudinal portion. For example, FIGS. 7–9 show that the bolt seats 30 on the cylinder head 15 lie in a different plane from the rim 31. Similarly, the camshaft cover 16 has bolt seats 32 that lie in a different plane from the rim 33. The flexing of the tab-like ring gaskets 25 accommodates this structure.

One feature is of particular significance in connection with these ring gaskets 25 which seal around the bolt. It is, of course, very important to seal around each bolt 17 because otherwise engine lubricant can leak out around the bolt 17. This is counteracted in this instance by the use of a rib 27 which is provided around each bolt opening and which is unique in that, as seen in cross section (see FIG. 3), it is wedgeshaped having a shallow portion 28 at its outer edge, that is the edge facing out from the enclosed space and therefore closest to the longitudinal portion 11 or 12 of the gasket. The wedgeshaped rib 27 reaches its thickest at a portion 29, where it is closest to the main cavity or closest to the opposite longitudinal member 12 or 11. The effect of this is that when the bolts 17 are tightened, they press the cover 16 down against this rib 27 and seal very tightly around the bolts 17 at the place where that is necessary. In other words, the bolt shank is completely enclosed, and pressure is brought to bear in such a way that the angular insertion of the bolts 17 (see FIG. 2) is compensated for directly in the gasket 10.

Thus, it will be seen that the camshaft cover gasket 10 acts to prevent the wrinkling around the arcuate ends, because the portions 13 and 14 are already arcuate. The gasket 10 acts further to prevent leakage by having the integral ribs 22 and 23 which bear against the stamped metal member 16, which is more apt to be deformed or have defects, and it provides wedgeshaped ribs around each bolt opening to insure against leakage at the bolts.

Other forms of the invention are, of course, within the scope of the invention and within the scope of the claims so it is not really necessary to show other embodiments. There may be other three dimensional shapes that are not strictly arcuate or arcs that are larger or smaller, and the shape of the gasket may be substantially circular or oval, if that is desired with changes in the three-dimensional aspects compensated for by direct molding of the gasket. Also, the wedging of the bolt openings may be changed to other wedge types of configurations to compensate for a different pattern of insertion of the bolts themselves.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A sealing boundary gasket for compression between flanged portions of two mating metal members each having two longitudinal side portions that are flat but lie in different planes and end portions that join said side portions, comprising
   a one-piece integrally molded elastomeric configuration of homogeneous composition throughout having two lengthwise strip portions that are generally planar and two end strip portions,
   said two longitudinal strip portions including, as integral portions thereof and of the same homogeneous composition, series of inwardly projecting flexible portions for fully encircling bolts and for lying in a different plane from their adjacent strip portion and gasketing around them, each said flexible portion having a bolt-encircling rib for each bolt completely surrounding a bolt opening and being wedge-shaped so that each bolt-encircling rib has a highest portion leading smoothly to a diametrically opposite lowest portion, so that the load is substantially uniform around each bolt-encircling rib.

2. The gasket of claim 1 wherein said four strip portions are flat on one gasket surface and have a plurality of continuous ribs on the other gasket surface.

3. The gasket of claim 1 wherein said end strip portions are, as molded, arcuate.

4. A sealing boundary gasket for compression between flanged portions of two mating metal members each having two longitudinal side portions that are flat but lie in different planes and end portions that are arcuate and join said side portions, comprising
   a one-piece integrally molded elastomeric configuration of uniform composition throughout having two lengthwise strip portions that are each generally planar and two end strip portions that, as molded, are arcuate to match the curve of the arcuate portions of said mating metal members between which they are to lie, said four strip portions having one gasket surface flat and the other gasket surface being provided with at least one continuous rib,
   said two longitudinal strip portions including series of portions integral with said strip portions and of the same uniform composition for encircling bolts and gasketing around them, said ribbed surface including a bolt-encircling rib for each bolt completely surrounding a bolt opening and being wedge-shaped so that each bolt-encircling rib is highest where it is closest to the opposite longitudinal strip portion and lowest where it is farthest therefrom.

5. A sealing boundary gasket for compression between flanged portions of two mating metal members each having two longitudinal side portions that are flat but lie in different planes and end portions that join said side portions, comprising
  a one-piece integrally molded elastomeric configuration of homogeneous composition throughout having two lengthwise strip portions that are generally planar and two end strip portions,
  said two longitudinal strip portions including, as integral portions thereof and of the same homogeneous composition, a series of flexible portions for fully encircling bolts and gasketing around them, each said flexible portion having a bolt-encircling rib for each bolt completely surrounding a bolt opening and being wedge-shaped so that each bolt-encircling rib has a highest portion leading smoothly to a diametrically opposite lowest portion, so that the load is substantially uniform around each bolt-encircling rib.

* * * * *